(12) United States Patent
Kusche et al.

(10) Patent No.: US 6,722,467 B1
(45) Date of Patent: Apr. 20, 2004

(54) NOISE ATTENUATOR FOR AN AIR SUPPLY SYSTEM OF AN INTERNAL COMBUSTION ENGINE

(75) Inventors: David W. Kusche, Oshkosh, WI (US); Michael A. Freund, Oshkosh, WI (US); Michael D. Docter, N. Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/229,633

(22) Filed: Aug. 28, 2002

(51) Int. Cl.⁷ .............................................. F02M 35/00
(52) U.S. Cl. ...................... 181/229; 181/230; 181/232; 181/255; 181/256; 181/222
(58) Field of Search ................................. 181/229, 230, 181/232, 255, 256, 222

(56) References Cited

U.S. PATENT DOCUMENTS

| 3,864,064 | A | | 2/1975 | Gannaway | 417/312 |
|---|---|---|---|---|---|
| 4,254,746 | A | * | 3/1981 | Chiba et al. | 123/184.42 |
| 4,330,239 | A | | 5/1982 | Gannaway | 417/312 |
| 4,846,300 | A | * | 7/1989 | Boda | 181/229 |
| 4,969,536 | A | * | 11/1990 | Allen | 181/229 |
| 5,196,654 | A | * | 3/1993 | DiFlora et al. | 181/229 |
| 5,733,106 | A | | 3/1998 | Lee | 417/312 |
| 5,906,477 | A | | 5/1999 | Kim et al. | 417/312 |
| 5,938,411 | A | | 8/1999 | Seo | 417/312 |
| 6,056,611 | A | | 5/2000 | House et al. | 440/88 |
| 6,206,135 | B1 | | 3/2001 | Kim et al. | 181/229 |
| 6,238,258 | B1 | | 5/2001 | Ozawa | 440/88 |
| 6,287,098 | B1 | | 9/2001 | Ahn et al. | 418/63 |
| 6,382,931 | B1 | | 5/2002 | Czabala et al. | 417/312 |

* cited by examiner

*Primary Examiner*—Shih-yung Hsieh
(74) *Attorney, Agent, or Firm*—William D. Lanyi

(57) ABSTRACT

A sound attenuation system for a compressor of a direct fuel injected engine of an outboard motor comprises a discharge sound attenuator connected in fluid communication with an air distribution manifold outlet and a suction sound attenuator connected in fluid communication with the suction port of a compressor. In a typical application of the present invention, the air distribution manifold is connected in fluid communication with a discharge port of the compressor. Both the discharge sound attenuator and the suction sound attenuator can further include filter media disposed within their internal cavities.

17 Claims, 4 Drawing Sheets

NOISE ATTENUATOR FOR AN AIR SUPPLY SYSTEM OF AN INTERNAL COMBUSTION ENGINE

BACKGROUND OF THE INVENTION

1. Field of the Invention

The present invention is generally related to an air supply system for an internal combustion engine and, more particularly, to a system for attenuating the sound emanating from a compressor used in conjunction with a fuel injected internal combustion engine.

2. Description of the Prior Art

Those skilled in the art of internal combustion engines are aware of the use of compressors in conjunction with fuel injected systems, particularly direct fuel injected systems that inject a fuel/air mixture directly into the combustion chamber of the cylinders of the engine. Skilled artisans in the field of sound attenuation are familiar with the use of expansion chambers which represent one of the types of silencing elements utilized in both intake and exhaust systems. In its simplest form, the expansion chamber consists of an inlet pipe, an expansion in area, an empty chamber, a contraction in area, and an outlet pipe. The expansion chamber was analytically modeled in the early 1950's for plane-wave propagation assuming linear acoustics with no flow. This analysis revealed that the expansion chamber's transmission loss is a function of the area expansion ratio of the expansion chamber, defined as the area of the cross section of the expansion chamber divided by the area of the cross section of the inlet tube.

U.S. Pat. No. 5,733,106, which issued to Lee on Mar. 31, 1998, describes a suction muffler for a reciprocating compressor with external holes to reduce noise attenuation. The compressor includes a cylinder block disposed in a chamber formed by a casing. A piston is mounted for reciprocation in a bore of the cylinder block. A valved cylinder head is disposed at the end of the bore. The cylinder head conducts fluid to the bore. The fluid enters the casing through an inlet therein and travels through a suction passage formed by a suction muffler and then through a base muffler before entering the cylinder head. The suction muffler includes exterior holes for communicating the suction passage of the suction muffler with a chamber of the casing, to thereby reduce the suction load occurring at the bore and valve plate.

U.S. Pat. No. 3,864,064, which issued to Gannaway on Feb. 4, 1975, describes a suction muffler tube for a compressor. A gas compressor having a suction muffler assembly for attenuating both high and low frequency noise produced by the inlet valve of the compressor is described. It includes an inner suction tube extending from the compressor intake to a muffler and a bypass tube surrounding the suction tube with the bypass tube having bypass apertures in the upper end thereof, whereby the effective cross-sectional area of the suction intake tube may be reduced thereby attenuating low frequency noise while at the same time retained adequate gas inflow to the compressor intake.

U.S. Pat. No. 6,382,931, which issued to Czabala et al on May 7, 2002, describes a compressor muffler. A muffler assembly for muffling noises associated with a compressor is described. The muffler assembly is mounted on the compressor such that the two move as a solid body. The muffler assembly includes an intake having a hollow interior adapted to receive a first flow of gas from the ambient environment. A baffle disposed in the hollow interior of the intake restricts the flow of gas through the intake. In one embodiment, the baffle defines at least a portion of a plurality of fluid portals that separate the first flow of gas into a plurality of flows of gas as the gas passes from the first side of the baffle to a second side of the baffle. As a result, the first flow of gas is disturbed and noise from the compressor is thereby attenuated. In another embodiment, a plurality of baffles are disposed in the hollow interior of the intake to define a tortuous path for the flow of gas through the intake for attenuating noise.

U.S. Pat. No. 5,938,411, which issued to Seo on Aug. 17, 1999, describes a compressor noise reducing muffler. The muffler includes a base muffler for a suction muffler connected to an upper end of the base muffler. Gaseous coolant flows through the suction muffler and the base muffler and into a cylinder head of a compressor. The suction muffler defines a path of travel wherein all of the gaseous coolant flows vertically downwardly, then horizontally, and then vertically downwardly to the base muffler.

U.S. Pat. No. 6,238,258, which issued to Ozawa on May 29, 2002, describes a direct air fuel injected watercraft engine. A number of embodiments of personal watercraft having engines that employ fuel air injection systems is described. The fuel air injection system is protected from the water ingestion by placing its inlet in an area that will be above the water level regardless of whether the watercraft is operating upright or is inverted and during the transition between these positions. In addition, an arrangement is provided for cooling the air compression so as to improve efficiency.

U.S. Pat. No. 6,206,135, which issued to Kim et al on Mar. 27, 2001, describes a suction noise muffler for a hermetic compressor. A suction noise muffler for a hermetic compressor which is capable of enabling a smooth flow of a refrigerant gas and reducing a suction noise by forming a predetermined shaped refrigerant gas flow guide path and a plurality of noise reducing sections, which includes an upper casing having a rectangular outer wall and a plurality of inner walls arranged within the outer wall, and a lower casing whereby the upper casing is inserted into the lower casing, for thus forming a refrigerant gas flowing path and a plurality of noise reducing sections thereby when assembling the upper casing and lower casing.

U.S. Pat. No. 6,287,098, which issued to Ahn et al on Sep. 11, 2001, describes a muffler for a rotary compressor. The compressor includes a main bearing having a discharge passage for discharging compressed gas and a boss for inserting a motor shaft, the main bearing forming a component of a compression chamber, and a muffler having a boss hole for passing the boss of the main bearing and a discharge opening for discharging the compressed gas, the muffler mounted on the main bearing, wherein the discharge opening in the muffler is formed at least one in number inside the discharge passage in the main bearing, whereby attenuating a noise generated in operation of the rotary compressor.

U.S. Pat. No. 5,906,477, which issued to Kim et al on May 25, 1999, describes a suction noise muffler mounting apparatus for a hermetic compressor. An improved suction noise muffler mounting apparatus for a hermetic compressor is disclosed. It is capable of more simply mounting a suction noise muffler to a cylinder head, for thus reducing the number of fabrication processes and increasing the productivity of a hermetic compressor, which includes a suction noise muffler head having a protrusion having a predetermined height and formed on the upper surface thereof and integrally engaged to the upper end of the suction noise muffler, and a fixing member provided for mounting the suction noise muffler to a portion of the cylinder head.

U.S. Pat. No. 4,330,239, which issued to Gannaway on May 18, 1982, describes a compressor muffler. A muffler for a refrigeration gas compressor which is tuned such that the attenuation curve and the impedance curve cross the frequency access at the pumping frequency of the compressor so as to result in optimum sound attenuation for the higher frequencies with minimum impedance at the pumping frequency. The muffler comprises a housing having first and second compartments with an inlet tube in the first compartment adapted for connection to a compressor gas outlet line to permit gas flow from the compressor gas outlet into the first compartment. An elongated tube has a first section in the housing with an inlet in the first compartment, a second section in the housing with an outlet in the second compartment, with these sections being joined by a third curve section disposed entirely outside of the housing. An outlet from the second compartment leads to the exterior of the compressor housing.

U.S. Pat. No. 6,056,611, which issued to House et al on May 2, 2000, discloses an integrated induction noise silencer and oil reservoir. An oil reservoir is used as a sound attenuator in an outboard motor and is placed under the cowl of the outboard motor with the throats of the engine's throttle bodies disposed between the oil reservoir and the engine itself. This allows the sound emanating from the throttle bodies to be attenuated by the oil reservoir which is cup-shaped to partially surround the throat of the throttle bodies. A plate member can be attached to a hollow wall structure in order to enclose a cavity therebetween. The structure therefore serves as an oil reservoir for the engine and also as a sound attenuating member.

The patents described above are hereby expressly incorporated by reference in the description of the present invention.

In certain applications of an air compressor in conjunction with a fuel injected internal combustion engine, the operation of the compressor generates a significant amount of noise. When used in a marine vessel to provide propulsion therefore, a marine propulsion system comprising an air compressor can produce sufficient noise to diminish the enjoyment of operating the marine vessel. It would therefore be significantly beneficial if a relatively inexpensive sound attenuation system could be provided to reduce the sound emanating from the air compressor of the engine.

SUMMARY OF THE INVENTION

An air supply system for an internal combustion engine, made in accordance with the preferred embodiment of the present invention, comprises a compressor having a suction port and a discharge port. It also comprises an air distribution manifold, such as an air rail, having an inlet connected in fluid communication with the discharge port of the compressor. It also comprises a discharge sound attenuator connected in fluid communication with an outlet of the air distribution manifold. The discharge sound attenuator comprises an inflow conduit, an outflow conduit, and a chamber connected in fluid communication between the inflow and outflow conduits. The chamber has a cross sectional area, measured in a plane which is perpendicular to the direction of fluid flow, which is greater than a cross sectional area of the inflow conduit, measured in a plane which is perpendicular to the direction of fluid flow.

In a particularly preferred embodiment of the present invention, it further comprises a pressure regulator connected in fluid communication with the outlet of the air distribution manifold. The pressure regulator has an exhaust port connected in fluid communication with the inflow conduit of the discharge sound attenuator. A flexible hose is connected in fluid communication between the exhaust port of the pressure regulator and the inflow conduit of the discharge sound attenuator. The outflow conduit of the discharge sound attenuator is connected in fluid communication with ambient air pressure.

In a preferred embodiment of the present invention, it further comprises a suction sound attenuator connected in fluid communication with the suction port of a compressor. The suction sound attenuator comprises an inflow port, an outflow port, and a cavity connected in fluid communication between the inflow and outflow ports. The cavity has a cross-sectional area, measured in a plane which is perpendicular to the direction of fluid flow, which is greater than a cross sectional area of the inflow port, measured in a plane which is perpendicular to the direction of flow.

In a preferred embodiment of the present invention, the inflow port is connected in fluid communication with ambient air pressure and the outflow port is connected in fluid communication with the suction port of the compressor. A filter medium is disposed within the cavity and the air distribution manifold is an air rail. The internal combustion engine is a fuel injected engine and, more particularly, in a preferred embodiment of the present invention, the internal combustion engine is a direct fuel injected engine. A filter element is disposed within the chamber.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
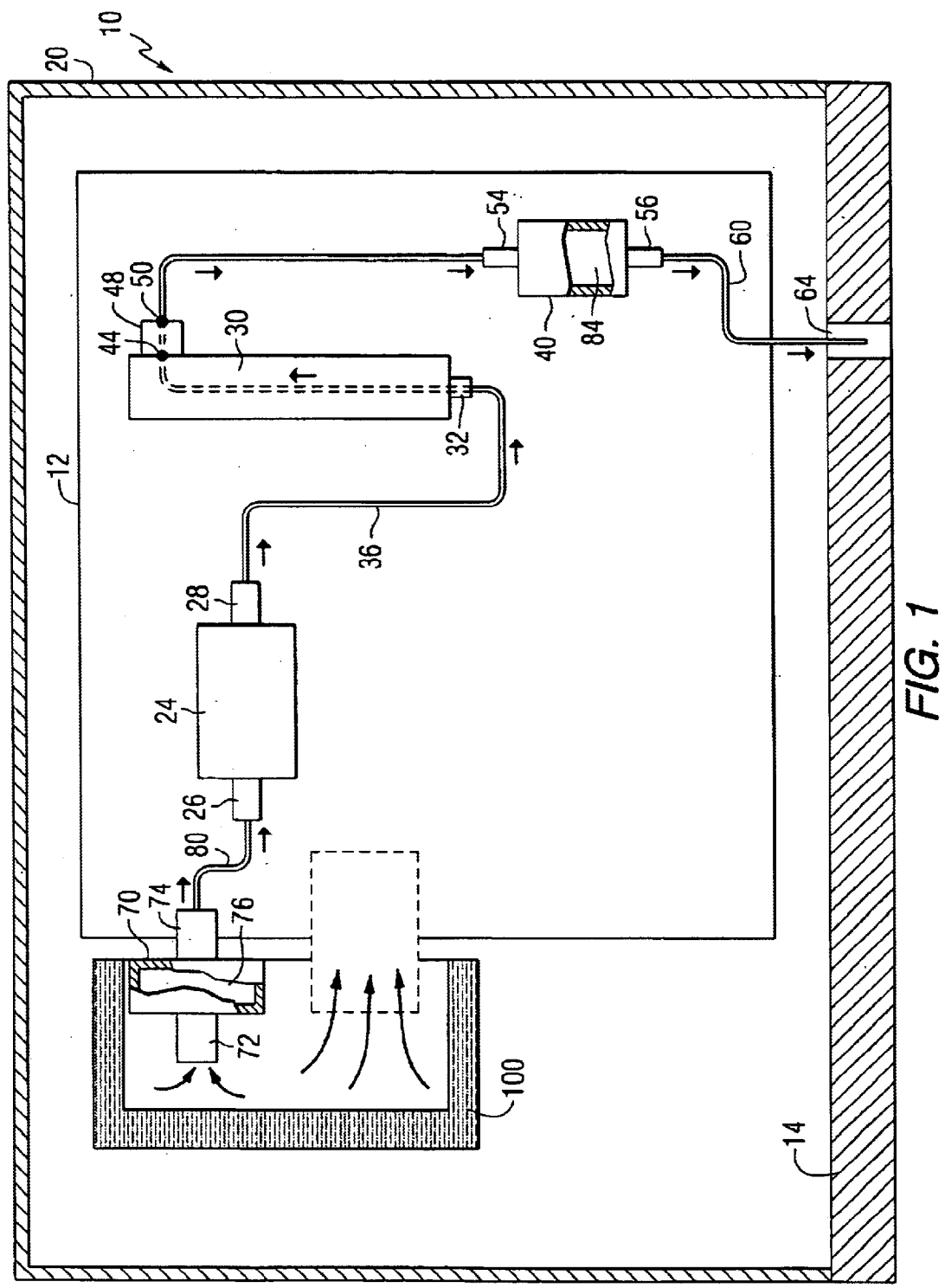
FIG. 1 is a simplified schematic representation of an outboard motor engine and compressed air supply system.

Throughout the description of the preferred embodiment of the present invention, like components will be identified by like reference numerals.

FIG. 1 is a simplified schematic representation of an outboard motor 10 with a fuel injected engine 12 being supported above an adapter plate 14. The engine is enclosed within a cowl 20. In order to supply compressed air for the fuel injectors of the engine 12, a compressor 24 is provided. The compressor has a suction port 26 and a discharge port 28. An air distribution manifold 30 has an inlet 32 which is connected in fluid communication with the discharge port 28 of the compressor 24. In a preferred embodiment, a generally flexible hose, or conduit 36, is connected between the discharge port 28 of the compressor 24 and the inlet 32 of the air distribution manifold 30. It should be understood that the air distribution manifold in most applications of the present invention is an air rail that is used to distribute compressed air to a plurality of fuel injectors.

A discharge sound attenuator 40 is connected in fluid communication with an outlet 44 of the air distribution manifold 30. In a particularly preferred embodiment of the present invention, a pressure regulator 48 is connected in fluid communication with the outlet 44 of the air distribution manifold 30 between the outlet 44 and the inflow conduit 54 of the discharge sound attenuator 40. The pressure regulator 48 has an exhaust port 50 connected in fluid communication with the inflow conduit 54 of the discharge sound attenuator 40. An outflow conduit 56 of the discharge sound attenuator 40 is connected in fluid communication with ambient air pressure. This is represented by a flexible conduit 60 that directs a flow of air from the outflow conduit 56 to an opening 64 formed through the adapter plate 14. In a typical application of the present invention, the opening 64 allows the air flowing from the outflow conduit 56 to pass into a region within the lower portion of an outboard motor proximate a driveshaft housing. The precise disposition of the air after it passes out of the outflow conduit 56 is not limiting to the present invention.

With continued reference to FIG. 1, a suction sound attenuator 70 is connected in fluid communication with the suction port 26 of the compressor 24. The suction sound attenuator 70 comprises an inflow port 72, an outflow port 74, and a cavity 76 connected in fluid communication between the inflow and outflow ports, 72 and 74. The cavity 76 has a cross sectional area, measured in a plane which is perpendicular to the direction of fluid flow through the suction sound attenuator 70 which is larger than a cross sectional area of the inflow port 72, measured in a plane which is perpendicular to the direction of fluid flow through the suction sound attenuator 70. The inflow port 72 is connected in fluid communication with ambient air pressure and the outflow port 74 is connected in fluid communication with the suction port 26 of the compressor 24. In a typical application of the present invention, a flexible hose 80 provides this connection.

Figure 2:
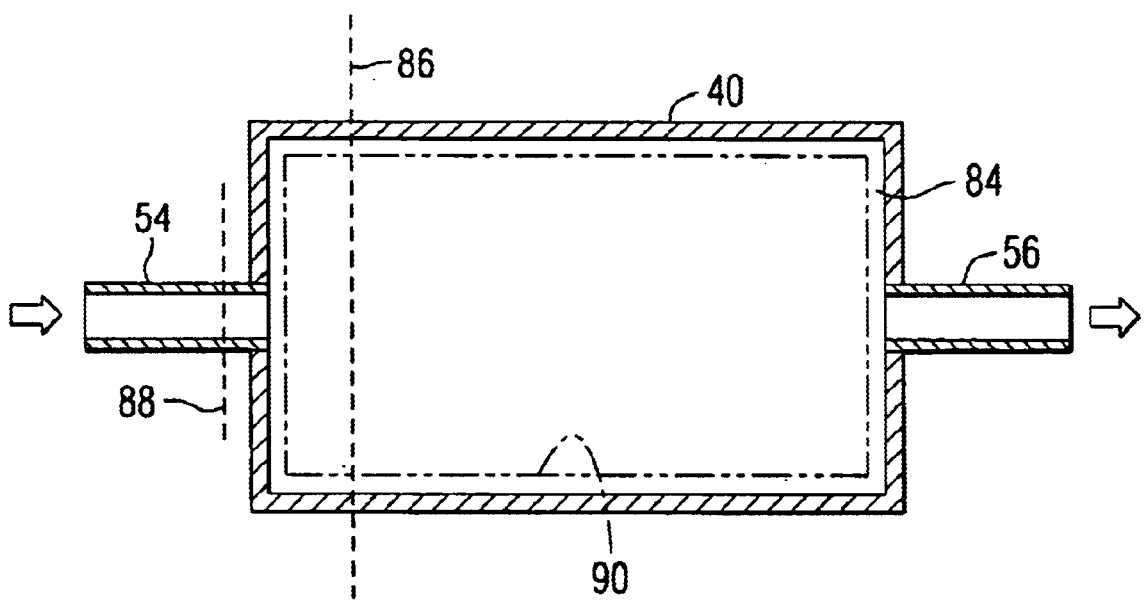
FIG. 2 is a section view of a discharge sound attenuator used in conjunction with the present invention.

FIG. 2 is a section view of the discharge sound attenuator 40. Air from the regulator 48, described above in conjunction with FIG. 1, flows into the inflow conduit 54. After the air passes through the chamber 84, it flows out of the outflow conduit 56. The direction of air flow is represented by the arrows in FIG. 2. The chamber 84 has a cross sectional area, measured in the plane 86 which is generally perpendicular to the direction of fluid flow from the inflow conduit 54 to the outflow conduit 56. The cross sectional area of the inflow conduit 54, measured-in the plane 88 which is generally perpendicular to the direction of fluid flow, is less than the cross sectional area of the chamber 84 described above. This relationship in cross sectional areas between the inflow conduit 54 and the chamber 84 attenuates the sound emanating from the compressor 24.

Illustrated by dashed lines in FIG. 2 is a filter element 90 which can be disposed within the chamber 84. In one preferred embodiment of the present invention, a fuel filter is used to serve as the discharge sound attenuator 40. The fuel filter, when purchased in commercial quantities from a standard fuel filter supplier contains a filter element 90. The filter element 90 is typically not removed from the chamber 84. Instead, the fuel filter is left within the chamber to serve as a sound baffle which provides an additional level of sound attenuation.

Figure 3:
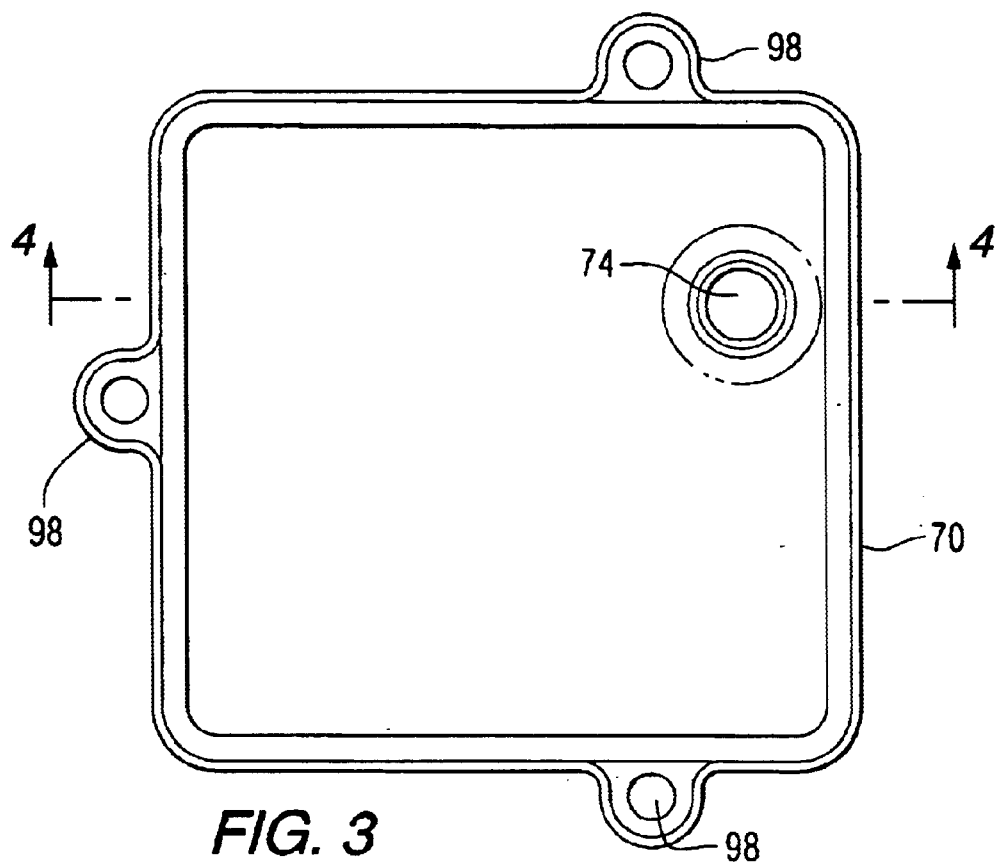
FIG. 3 shows a suction sound attenuator used in conjunction with the present invention.

FIG. 3 illustrates a suction sound attenuator 70 with its outflow port 74. The suction sound attenuator 70, as illustrated in FIG. 3, is provided with several mounting tabs 98 which allows it be rigidly attached to a noise silencing oil reservoir 100 which is illustrated in FIG. 1. It should be understood that the oil reservoir 100 is generally similar to the integrated induction noise silencer and oil reservoir disclosed in U.S. Pat. No. 6,056,611 which is described above, but is not a requirement in all embodiments of the present invention.

Figure 4:
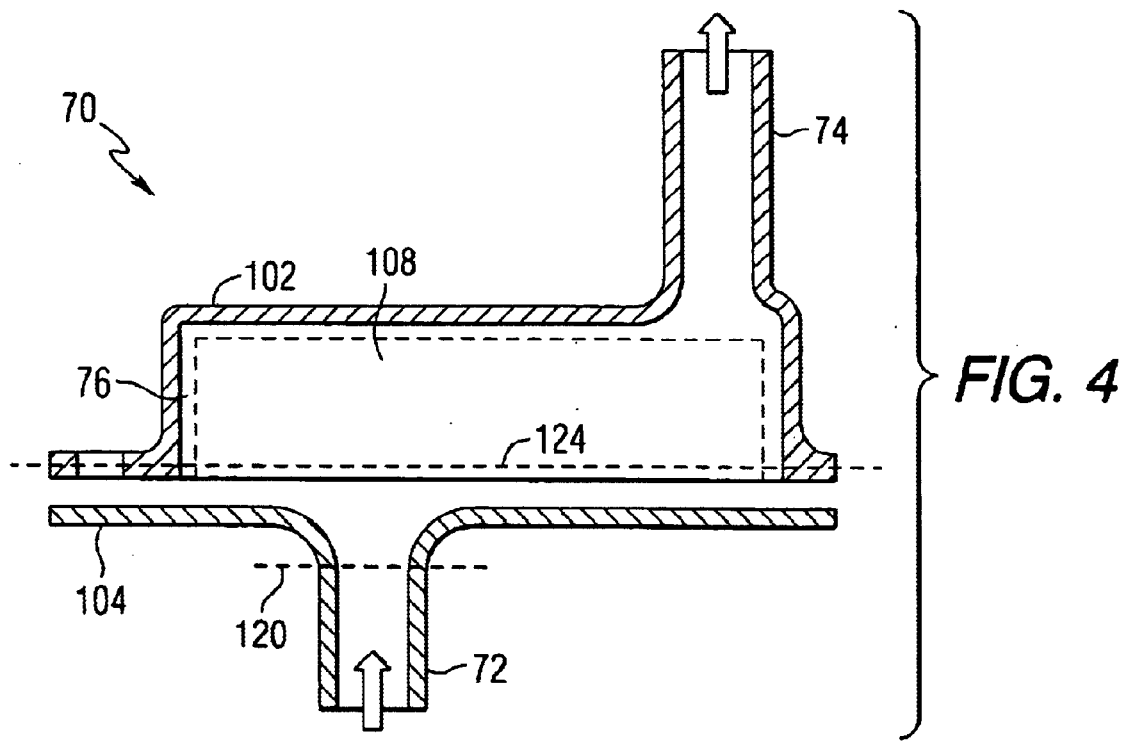
FIG. 4 is a section view of FIG. 3.

FIG. 4 is a section view of FIG. 3. The suction sound attenuator 70 comprises a housing portion 102 and a plate member 104. The plate member 104 comprises the inflow port 72 and the housing portion 102 comprises the outflow port 74. A filter medium 108 can be disposed within the internal cavity 76 formed when the housing 102 and the plate 104 are attached together. The cross sectional area of the inflow port 72, measured in the plane 120 which is generally perpendicular to the flow of air, is significantly less than the cross sectional area of the cavity 76 measured in the plane 124 which is generally perpendicular to the flow of air. In FIG. 4, the direction of air flow through the suction sound attenuator 70 is represented by the arrows shown in the figure. The filter medium 108 serves the purpose of removing particulates from the air stream as it flows from a position of ambient pressure to the suction port 26 of the compressor 24. In addition, the filter medium 108 further attenuates the sound emanating from the compressor 24.

With reference to FIGS. 1–4, it can be seen that the compressor 24 is provided with both a discharge-sound attenuator 40 and a-suction sound attenuator 70. These two sound attenuators reduce the level of sound emanating from the compressor 24 both from the discharge port 28 and the suction port 26. Both of the sound attenuators, 40 and 70, comprise inflow passages, 54 and 72, that are significantly smaller in cross sectional area than the chamber and cavity, 84 and 76, which are located downstream from the inflow conduit 54 and inflow port 72, respectively.

Figure 5:
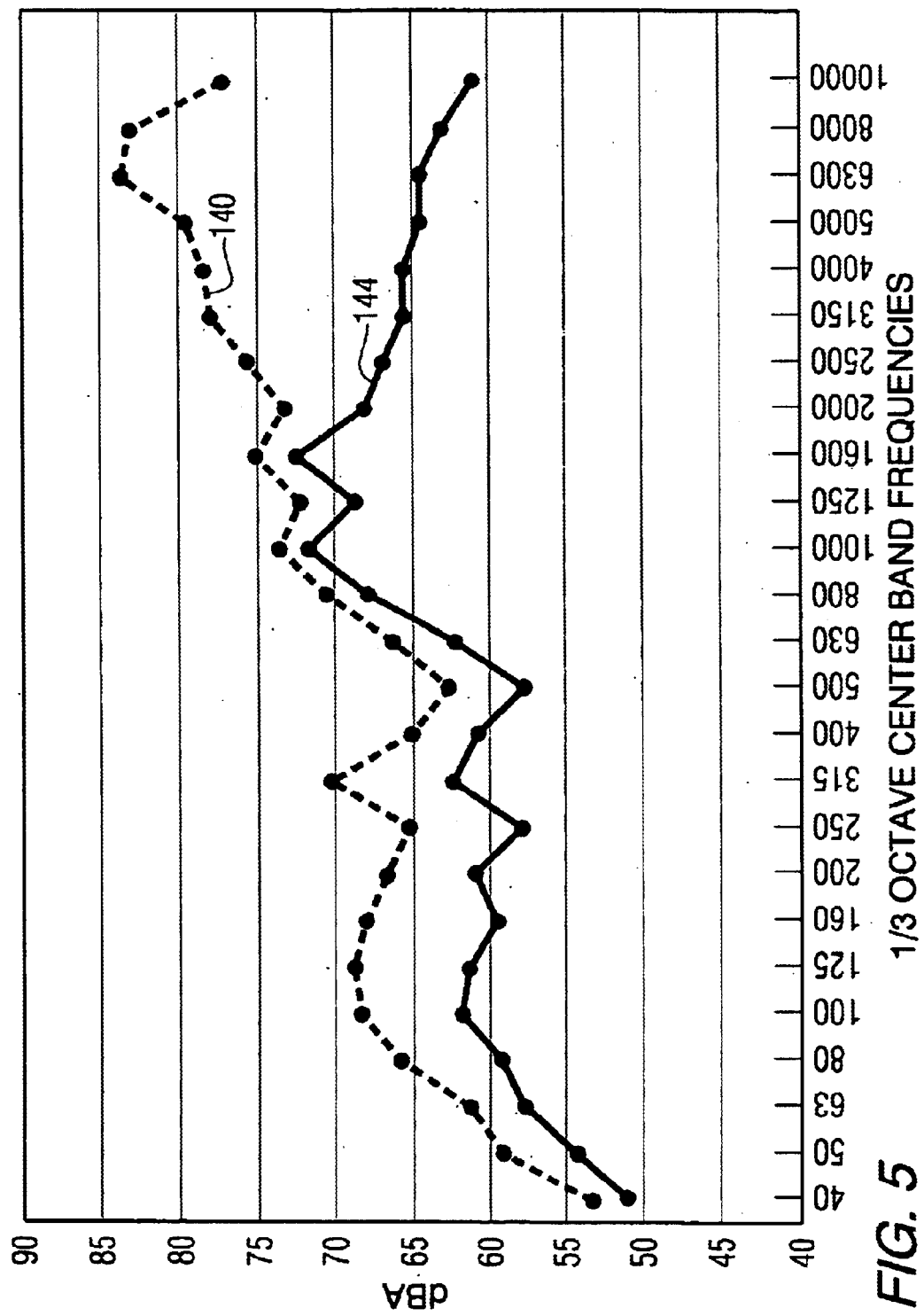
FIG. 5 is a graphical representation showing the sound attenuation improvement provided by the present invention.

FIG. 5 is a graphical representation of data obtained by testing a prototype direct fuel injection (DFI) engine for an outboard motor to determine the effectiveness of the present invention. The information represented in FIG. 5 relates to the engine of an outboard motor without a discharge sound attenuator 40, as represented by dashed line 140, and with a discharge sound attenuator 40, as represented by solid line 144. The discharge sound attenuator 40 used in conjunction with the information represented in FIG. 5 is similar to that shown in cross section in FIG. 2. It comprises an inflow conduit 54, an expansion in area, a chamber 84, a contraction in area, and an outflow conduit 56. The transmission loss caused by the device is a function of the area expansion ratio which is the ratio of the cross sectional area of the chamber 84 to the cross sectional area of the inflow conduit 54, which are measured within the planes 86 and 88, respectively. When pressure pulsations from the compressor 24 are exposed to the sudden change in cross sectional area within the discharge sound attenuator 40, there is a reduction in the magnitude of the pulses and, therefore, a reduction in the sound level produced by the pulses emanating from the compressor 24. As can be seen in FIG. 5, the beneficial sound attenuation is observable across the full range of frequencies. It should also be noted that the information graphically represented in FIG. 5 compares an engine with no muffler (dashed line 140) to an engine with the elements of the present invention installed to attenuate the engine noise (solid line 144).

Although the present invention has been described with particular specificity and illustrated to show a preferred embodiment, it should be understood that alternative embodiments are also within its scope.

We claim:

1. An air supply system for an internal combustion engine, comprising:

a compressor having a suction port and a discharge port;

an air distribution manifold having an inlet connected in fluid communication with said discharge port of said compressor;

a discharge sound attenuator connected in fluid communication with an outlet of said air distribution manifold, said discharge sound attenuator comprising an inflow conduit, an outflow conduit, and a chamber connected in fluid communication between said inflow and outflow conduits, said chamber having a cross sectional area, which is perpendicular to a direction of fluid flow, which is greater than a cross sectional area of said inflow conduit, which is perpendicular to said direction of fluid flow; and a pressure regulator connected in fluid communication with said outlet of said air distribution manifold, said pressure regulator having an exhaust port connected in fluid communication with said inflow conduit of said discharge sound attenuator.

2. The air supply system of claim 1, further comprising:
a flexible hose connected in fluid communication between said exhaust port of said pressure regulator and said inflow conduit of said discharge sound attenuator.

3. The air supply system of claim 1, wherein:
said outflow conduit of said discharge sound attenuator is connected in fluid communication with ambient air pressure.

4. The air supply system of claim 1, further comprising:
a suction sound attenuator connected in fluid communication with said suction port of said compressor, said suction sound attenuator comprising an inflow port, an outflow port, and a cavity connected in fluid communication between said inflow and outflow ports, said cavity having a cross sectional area, which is perpendicular to a direction of fluid flow, which is greater than a cross sectional area of said inflow port, which is perpendicular to said direction of fluid flow.

5. The air supply system of claim 4, wherein:
said inflow port is connected in fluid communication with ambient air pressure.

6. The air supply system of claim 4, wherein:
said outflow port is connected in fluid communication with said suction port of said compressor.

7. The air supply system of claim 4, further comprising:
a filter medium disposed within said cavity.

8. The air supply system of claim 1, wherein:
said air distribution manifold is an air rail.

9. The air supply system of claim 1, wherein:
said internal combustion engine is a fuel injected engine.

10. The air supply system of claim 9, wherein:
said internal combustion engine is a direct fuel injected engine.

11. The air supply system of claim 1, further comprising:
a filter element disposed within said chamber.

12. An air supply system for an internal combustion engine, comprising:
a compressor having a suction port and a discharge port;
an air distribution manifold having an inlet connected in fluid communication with said discharge port of said compressor;
a suction sound attenuator connected in fluid communication with said suction port of said compressor, said suction sound attenuator comprising an inflow port, an outflow port, and a cavity connected in fluid communication between said inflow and outflow ports, said cavity having a cross sectional area, which is perpendicular to a direction of fluid flow, which is greater than a cross sectional area of said inflow port, which is perpendicular to said direction of fluid flow;
a discharge sound attenuator connected in fluid communication with an outlet of said air distribution manifold, said discharge sound attenuator comprising an inflow conduit, an outflow conduit, and a chamber connected in fluid communication between said inflow and outflow conduits, said chamber having a cross sectional area, which is perpendicular to a direction of fluid flow, which is greater than a cross sectional area of said inflow conduit, which is perpendicular to said direction of fluid flow; and a pressure regulator connected in fluid communication with said outlet of said air distribution manifold, said pressure regulator having an exhaust port connected in fluid communication with said inflow conduit of said discharge sound attenuator.

13. The air supply system of claim 12, further comprising:
a flexible hose connected in fluid communication between said exhaust port of said pressure regulator and said inflow conduit of said discharge sound attenuator.

14. The air supply system of claim 13, wherein:
said outflow conduit of said discharge sound attenuator is connected in fluid communication with ambient air pressure.

15. The air supply system of claim 14, wherein:
said inflow port is connected in fluid communication with ambient air pressure.

16. The air supply system of claim 15, wherein:
said outflow port is connected in fluid communication with said suction port of said compressor.

17. An air supply system for an internal combustion engine, comprising:
a compressor having a suction port and a discharge port;
an air distribution manifold having an inlet connected in fluid communication with said discharge port of said compressor;
a suction sound attenuator connected in fluid communication with said suction port of said compressor, said suction sound attenuator comprising an inflow port, an outflow port, and a cavity connected in fluid communication between said inflow and outflow ports, said cavity having a cross sectional area, which is perpendicular to a direction of fluid flow from said inflow port to said outflow port, which is greater than a cross sectional area of said inflow port, which is perpendicular to said direction of fluid flow from said inflow port to said outflow port;
a discharge sound attenuator connected in fluid communication with an outlet of said air distribution manifold, said discharge sound attenuator comprising an inflow conduit, an outflow conduit, and a chamber connected in fluid communication between said inflow and outflow conduits, said chamber having a cross sectional area, which is perpendicular to a direction of fluid flow from said inflow conduit to said outflow conduit, which is greater than a cross sectional area of said inflow conduit, which is perpendicular to said direction of fluid flow from said inflow conduit to said outflow conduit; and
a pressure regulator connected in fluid communication with said outlet of said air distribution manifold, said pressure regulator having an exhaust port connected in fluid communication with said inflow conduit of said discharge sound attenuator.

* * * * *